United States Patent
Takahashi et al.

(10) Patent No.: US 8,441,164 B2
(45) Date of Patent: May 14, 2013

(54) OUTER ROTOR MOTOR

(75) Inventors: Tadanobu Takahashi, Wako (JP); Kentaro Fukui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 13/192,467

(22) Filed: Jul. 28, 2011

(65) Prior Publication Data

US 2012/0025662 A1  Feb. 2, 2012

(30) Foreign Application Priority Data

Aug. 2, 2010  (JP) ................. 2010-173795

(51) Int. Cl.
*H02K 1/12* (2006.01)
*H02K 1/14* (2006.01)

(52) U.S. Cl.
USPC ............ 310/194; 310/215; 310/216.091; 310/216.098; 310/216.099

(58) Field of Classification Search ........... 310/194, 310/215, 216.091, 216.098, 216.099, 216.105, 310/216.109, 254, 49 R
See application file for complete search history.

(56) References Cited

U.S. PATENT DOCUMENTS 5,852,335 A * 12/1998 Suzuki et al. ............ 310/254.1
7,340,822 B2 * 3/2008 Yamamura et al. ........... 29/598

FOREIGN PATENT DOCUMENTS

| JP | 61-81755 U | 5/1986 |
| JP | 08-298737 | 11/1996 |
| JP | 2002-315250 | 10/2002 |
| JP | 2006-311702 | 11/2006 |
| JP | 2006311702 A * | 11/2006 |

OTHER PUBLICATIONS

JP2006-311702A machine translation Nov. 16, 2012.*
Japanese Office Action for corresponding JP Application No. 2010-173795, Jul. 25, 2012.

* cited by examiner

*Primary Examiner* — Tran Nguyen
*Assistant Examiner* — Leda Pham
(74) *Attorney, Agent, or Firm* — Ditthavong Mori & Steiner, P.C.

(57) ABSTRACT

An outer rotor motor includes a stator and a rotor. The stator includes a stator core having a plurality of teeth, coils and insulators retaining the coils. The insulators are connected to each other in an annular configuration such that the teeth are inserted into the insulators. Each of the insulators includes a body portion and an outer peripheral flange. Each of the insulators further includes an auxiliary tooth portion on at least one of two axial ridge portions. The axial ridge portions include bonding portions between the body portion and the outer peripheral flange. The auxiliary tooth portion includes a rotor-facing surface facing the rotor and a tooth-contacting surface contacting one of the side surfaces in the circumferential direction.

6 Claims, 11 Drawing Sheets

OUTER ROTOR MOTOR

CROSS-REFERENCE TO RELATED APPLICATIONS

The present application claims priority under 35 U.S.C. §119 to Japanese Patent Application No. 2010-173795, filed Aug. 2, 2010, entitled "Outer Rotor Motor." The contents of this application are incorporated herein by reference in their entirety.

BACKGROUND OF THE INVENTION

1. Field of the Invention

The present invention relates to outer rotor motors.

2. Description of the Related Art

Japanese Unexamined Patent Application Publication No. 2002-315250, for example, discloses a stator of an outer rotor motor. The stator includes teeth having projections that project in a circumferential direction at the outer periphery thereof, and a wire is wound around the teeth. The projections that project from the teeth in the circumferential direction make magnetic flux variation gentle in a rotating operation, thereby reducing the generation of cogging torque and the occurrence of torque ripple and causing the rotor to smoothly rotate.

Also, a stator has been proposed which includes teeth without the projections that project in the circumferential direction and in which insulators around which a wire is wound are attached to the teeth from the outer side in the radial direction of the stator core such that the teeth are inserted into the insulators. With such a stator, the space factor of the coils is increased.

SUMMARY OF THE INVENTION

According to one aspect of the present invention, an outer rotor motor includes a stator and a rotor. The stator includes a stator core having a plurality of teeth that extend outward in a radial direction of the stator core, coils each including a winding portion formed by winding a wire, and insulators retaining the coils and connected to each other in an annular configuration such that the teeth are inserted into the insulators. Each of the insulators includes a body portion around which the wire is wound and an outer peripheral flange provided at an outer end of the body portion in the radial direction. The rotor includes a rotor holder and a rotor yoke fixed to an inner peripheral surface of the rotor holder. The stator and the rotor are arranged to face each other with a gap between the stator and the rotor in the radial direction. Each of the insulators is provided with an auxiliary tooth portion on at least one of two axial ridge portions. The axial ridge portions includes bonding portions between the body portion and the outer peripheral flange that face side surfaces of corresponding tooth among the tooth in a circumferential direction. The auxiliary tooth portion includes a rotor-facing surface facing the rotor and a tooth-contacting surface contacting one of the side surfaces in the circumferential direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

According to an embodiment of the present invention, an outer rotor motor (for example, an outer rotor motor 1 in the embodiment described below) includes a stator (for example, a stator 10 in the embodiment described below) and a rotor (for example, a rotor 4 in the embodiment described below). The stator that includes a stator core (for example, a stator core 11 in the embodiment described below) having a plurality of teeth (for example, teeth 11b in the embodiment described below) that extend outward in a radial direction, coils (for example, coils 14 in the embodiment described below) which each include a winding portion (for example, a winding portion 20 in the embodiment described below) formed by winding a wire (for example, a wire bundle 15 in the embodiment described below), and insulators (for example, insulators 13 in the embodiment described below) that retain the respective coils and that are connected to each other in an annular configuration such that the teeth are inserted into the insulators. The rotor that includes a rotor holder (for example, a rotor holder 5 in the embodiment described below) and a rotor yoke (for example, a rotor yoke 6 in the embodiment described below) fixed to an inner peripheral surface of the rotor holder. The stator and the rotor are arranged so as to face each other with a gap therebetween in the radial direction. Each insulator includes a body portion (for example, a body portion 30 in the embodiment described below) around which the wire is wound and an outer peripheral flange (for example, an outer peripheral flange 31 in the embodiment described below) provided at an outer end of the body portion in the radial direction. Each insulator is provided with an auxiliary tooth portion (for example, an auxiliary tooth portion 60 in the embodiment described below) on at least one of two axial ridge portions (for example, axial ridge portions 39 in the embodiment described below), which are bonding portions between the body portion and the outer peripheral flange that face side surfaces (for example, side surfaces 11f in the embodiment described below) of the corresponding tooth in a circumferential direction, the auxiliary tooth portion including a rotor-facing surface (for example, a rotor-facing surface 61 in the embodiment described below) that faces the rotor and a tooth-contacting surface (for example, a tooth-contacting surface 62 in the embodiment described below) that contacts one of the side surfaces of the tooth in the circumferential direction.

According to the embodiment of the present invention, the space factor of the coils can be increased. In addition, the magnetic flux variation in a rotating operation can be made gentle, so that the generation of cogging torque and the occurrence of torque ripple can be reduced. Accordingly, the rotor can smoothly rotate.

In the above-described structure, preferably, the auxiliary tooth portion has a substantially triangular columnar shape including an inclined surface (for example, an inclined surface 63 in the embodiment described below) that connects the rotor-facing surface and the tooth-contacting surface to each other.

In such a case, the size of a useless portion of the auxiliary tooth portion that does not largely contribute to the reduction of the cogging torque and the torque ripple can be reduced. Accordingly, the amount of the material of the auxiliary tooth portion can be reduced without degrading the performance. As a result, the manufacturing cost can be reduced.

In the above-described structure, preferably, the rotor-facing surface has an arc shape that extends substantially continuously from an outer end surface (for example, an outer end surface 11e in the embodiment described below) of the tooth in the radial direction.

In such a case, a constant gap can be provided between the rotor and the stator. Accordingly, the driving/regeneration efficiency can be increased. In addition, the magnetic flux flow can be smoothed, so that the rotation can be stabilized.

In the above-described structure, preferably, the rotor-facing surface projects outward in the radial direction of the stator from the body portion of the insulator.

In such a case, the auxiliary tooth portion can be positioned near the rotor, and the driving/regeneration efficiency can be increased. Accordingly, the generation of cogging torque and the occurrence of torque ripple can be further reduced.

In the above-described structure, preferably, the inclined surface of the auxiliary tooth portion is provided with at least one fitting portion (for example, projections 64 in the embodiment described below) that is fitted to the insulator.

In such a case, the bonding force between the auxiliary tooth portion and the insulator can be increased. Accordingly, even when a force, such as a magnetic attraction fore, is applied to the auxiliary tooth portion from the rotor in a radially outward direction, the auxiliary tooth portion can be prevented from being detached from the insulator.

In the above-described structure, preferably, the rotor-facing surface and the tooth-contacting surface are not covered by resin of the insulator, and are exposed.

In such a case, the gap between the rotor-facing surface and the rotor and the gap between the tooth-contacting surface and the tooth can be minimized. Accordingly, the driving/regeneration efficiency can be increased and the generation of cogging torque and the occurrence of torque ripple can be further reduced.

An outer rotor motor according to an embodiment of the present invention will now be described with reference to the accompanying drawings. The drawings are to be viewed in the orientation of reference numerals. The reference numerals designate corresponding or identical elements throughout the various drawings.

Figure 1:
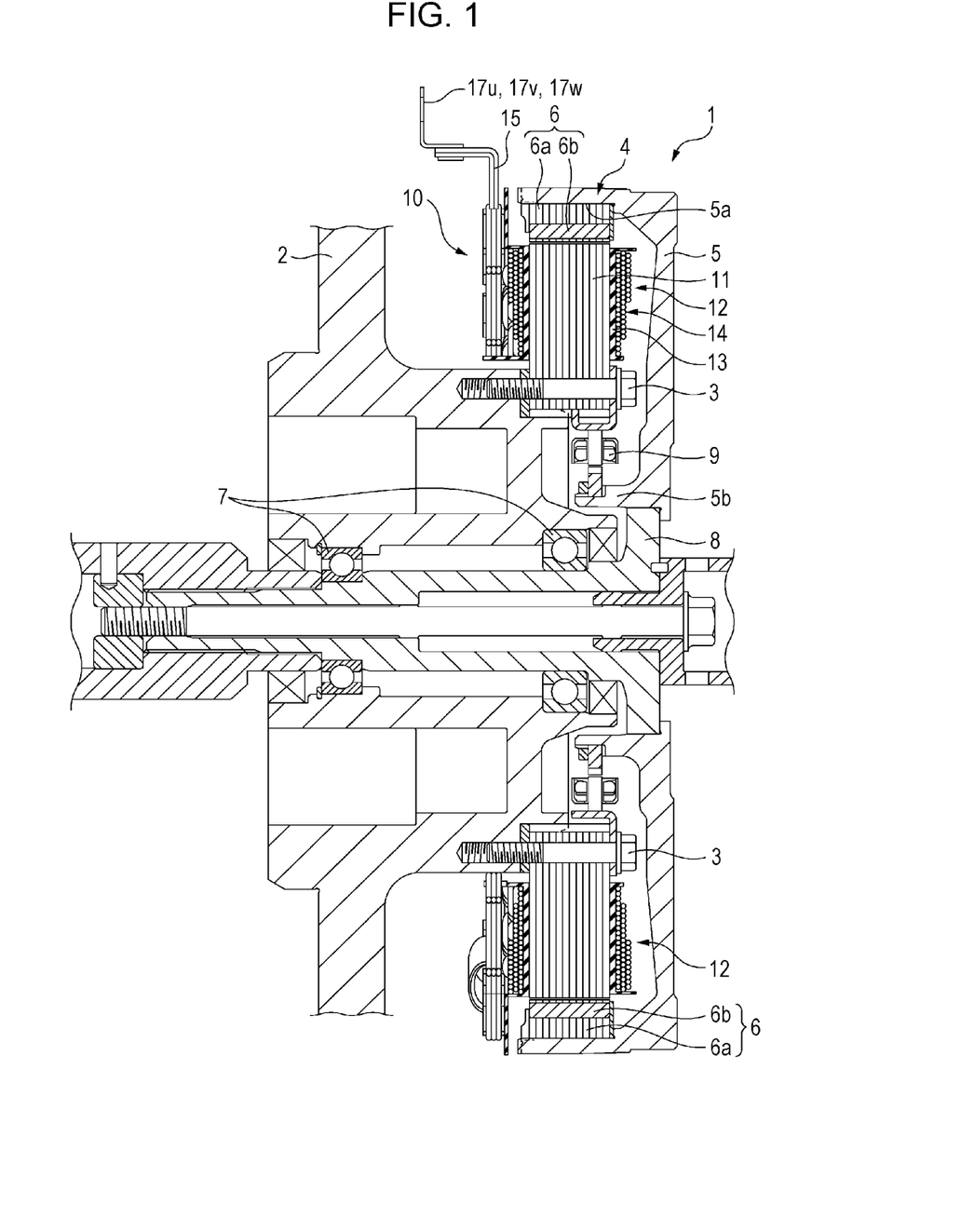
FIG. 1 is a sectional view of the main part of an outer rotor motor according to an embodiment of the present invention.

The outer rotor motor 1 according to the present embodiment is a three-phase, eight-pole outer-rotor salient-pole concentrated winding motor. Referring to FIG. 1, the outer rotor motor 1 includes a stator 10 fixed with bolts 3 to a motor housing 2 and an annular rotor 4 arranged at the outer periphery of the stator 10 with a small gap therebetween in a radial direction.

The rotor 4 includes an annular rotor yoke 6 that includes a rotor core 6a formed by stacking magnetic steel plates and a magnet 6b that is embedded in the rotor core 6a. The rotor yoke 6 is fixed to an inner peripheral surface 5a of a rim portion of a disc-shaped rotor holder 5 having the rim portion. The rotor 4 is fixed to a rotational shaft 8, which is rotatably supported by ball bearings 7 and 7 that are internally fitted to the motor housing 2, such that the rotor 4 can rotate together with the rotational shaft 8. The rotor 4 is rotated by a rotating magnetic field generated by the stator 10. A resolver 9 that detects a magnetic pole position of the rotational shaft 8 is arranged between a base portion 5b of the rotor holder 5 and the stator 10.

Figure 2:
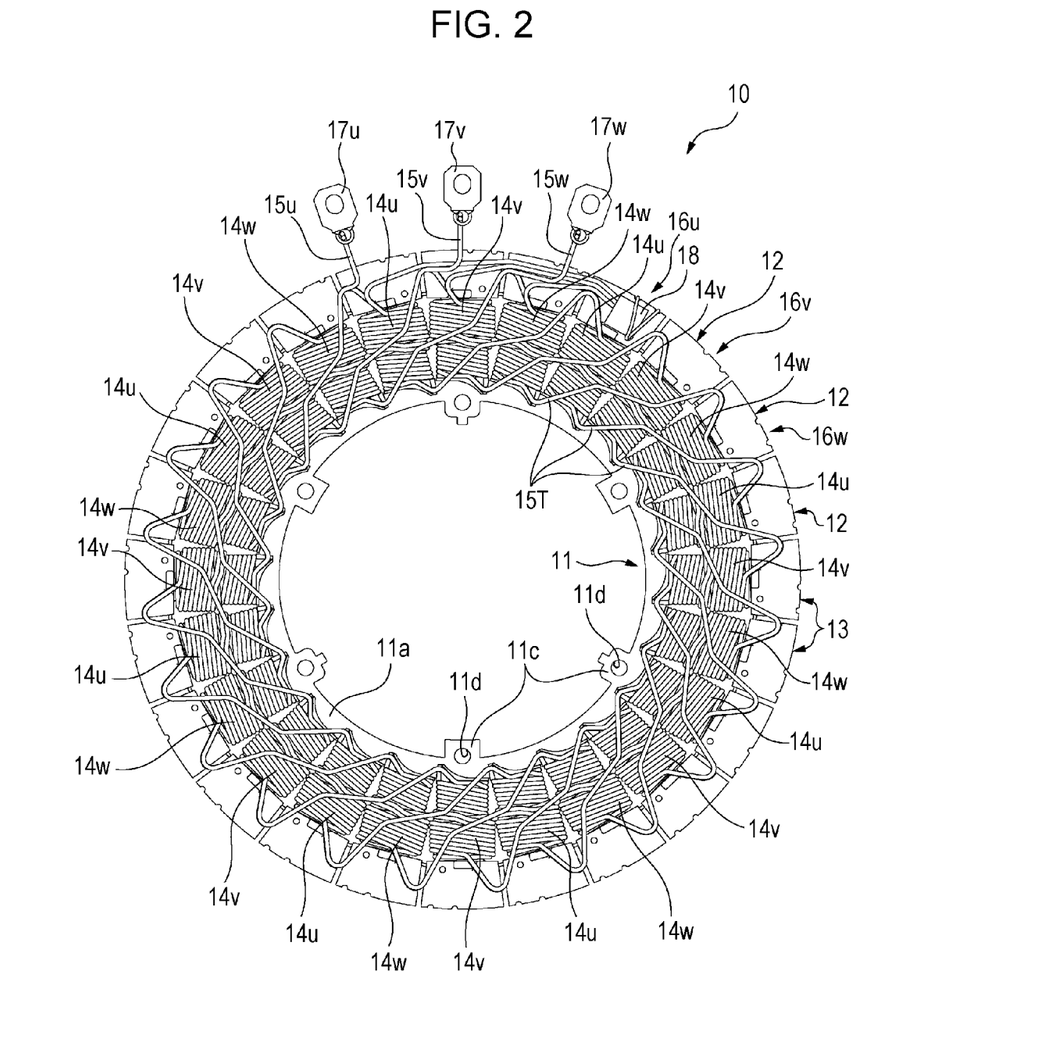
FIG. 2 is a front view of a stator illustrated in FIG. 1.
Figure 3:
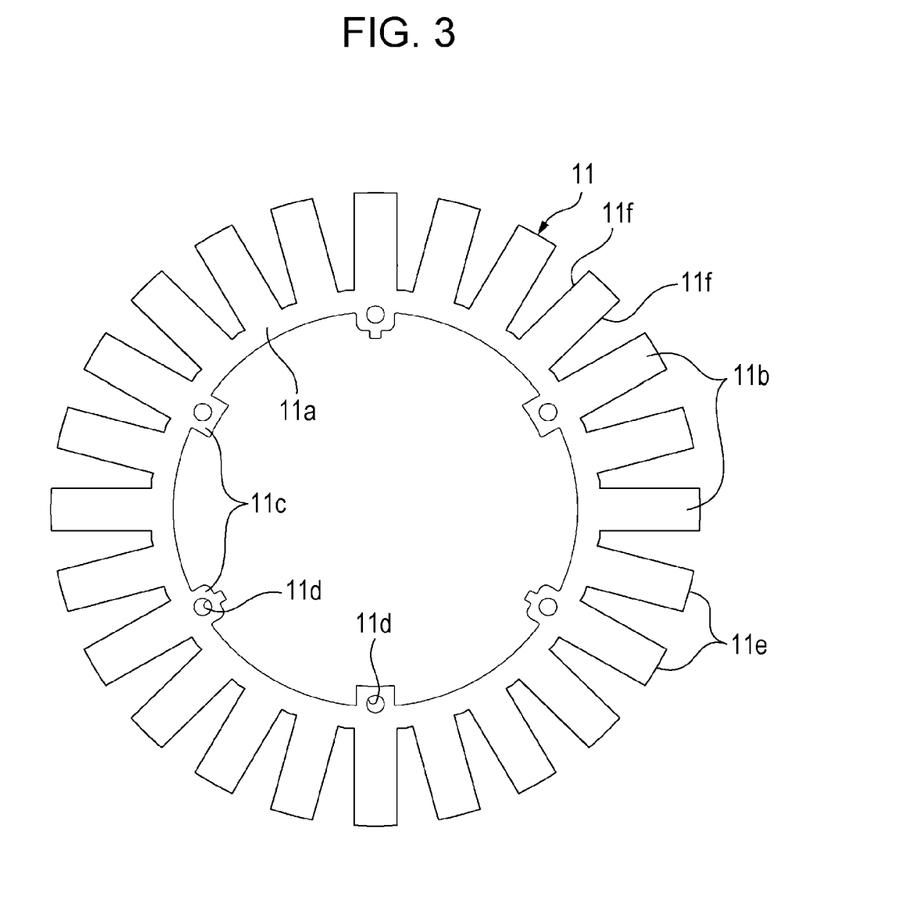
FIG. 3 is a front view of a stator core illustrated in FIG. 2.

As illustrated in FIGS. 2 and 3, the stator 10 includes a stator core 11 and twenty-four core pieces 12 that are connected to each other in an annular configuration. The stator core 11 is formed by stacking a plurality of magnetic steel plates in the axial direction of the stator 10, and includes an annular support portion 11a and twenty-four teeth 11b that project outward in the radial direction from the support portion 11a and that are arranged in the circumferential direction of the stator 10. The teeth 11b do not have projections that project in the circumferential direction and are formed in a substantially rectangular shape so that the core pieces 12 can be attached to the teeth 11b from the outer side in the radial direction such that the teeth 11b are inserted into the core pieces 12. In addition, outer end surfaces 11e of the teeth 11b in the radial direction are formed in an arc shape that extends along the inner peripheral surface of the rotor yoke 6. Accordingly, the outer end surfaces 11e can be arranged so as to face the rotor yoke 6 with a small gap therebetween in the radial direction.

Six projections 11c having bolt holes 11d are provided on the inner peripheral surface of the support portion 11a of the stator core 11 with constant intervals therebetween in the circumferential direction. The stator 10 is fixed to the motor housing 2 by inserting the bolts 3 into the bolt holes 11d.

Figure 4:
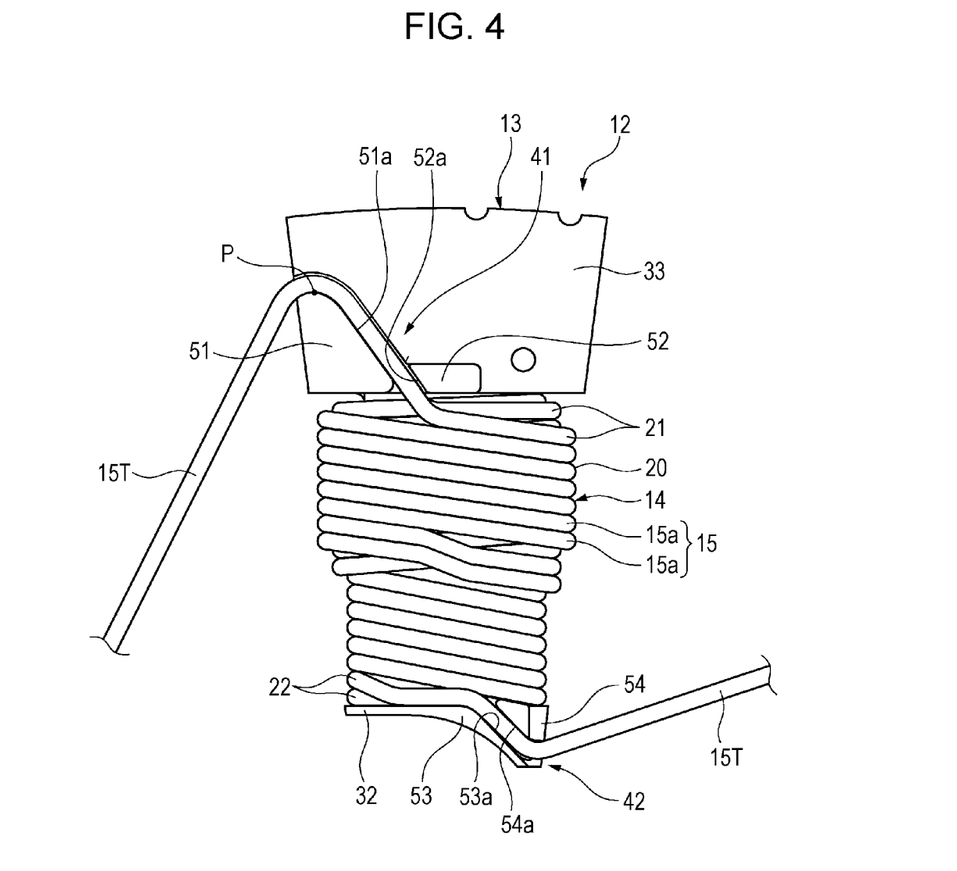
FIG. 4 is a front view of one of core pieces illustrated in FIG. 2.

Referring to FIG. 4, each core piece 12 includes an insulator 13 and a coil 14. The insulator 13 is formed of, for example, an insulating synthetic resin, and is attached into each tooth 11b of the stator core 11 such that the tooth 11b is inserted into the insulator 13. The coil 14 is formed by winding a wire bundle 15, which includes two wires 15a and 15a, around the insulator 13. Thus, the wire bundle 15 is wound around each tooth 11b of the stator core 11 in a salient-pole concentrated winding configuration.

Referring to FIG. 2, the coils 14 include eight coils for each of three phases, that is, eight U-phase coils 14u, eight V-phase coils 14v, and eight W-phase coils 14w. The coils 14 are provided on the teeth 11b of the stator core 11 such that the U-phase coils 14u, the V-phase coils 14v, and the W-phase coils 14w are arranged in that order in the circumferential direction of the stator 10. Thus, the coils 14 of the same phase (for example, the U-phase coils 14u) are connected to each other by crossover portions 15T of a single wire bundle 15 with the coils 14 of the other phases (for example, the V-phase coils 14v and the W-phase coils 14w) provided therebetween.

Referring to FIG. 2, each set of eight coils 14 for each phase (U-phase, V-phase, and W-phase coils 14u, 14v, and 14w) form a single coil group 16 (U-phase, V-phase, and W-phase coil groups 16u, 16v, and 16w). The eight coils 14 (U-phase, V-phase, and W-phase coils 14u, 14v, and 14w) included in each coil group 16 (U-phase, V-phase, and W-phase coil groups 16u, 16v, and 16w) are formed by continuously winding a single wire bundle 15 (U-phase, V-phase, and W-phase wire bundles 15u, 15v, and 15w).

An end of the U-phase wire bundle 15u of the U-phase coil group 16u is connected to a U-phase connection terminal 17u. An end of the V-phase wire bundle 15v of the V-phase coil group 16v is connected to a V-phase connection terminal 17v. An end of the W-phase wire bundle 15w of the W-phase coil group 16w is connected to a W-phase connection terminal 17w. The other ends of the wire bundles 15u, 15v, and 15w of the coil groups 16u, 16v, and 16w are connected to a neutral terminal 18.

Referring to FIG. 4, each coil 14 includes a winding portion 20 in which the wire bundle 15 is annularly wound around the insulator 13 into a layered structure, a first winding end 21 which is an end of the wire bundle 15 at an outer end of the winding portion 20 in the radial direction of the stator 10, and a second winding end 22 which is an end of the wire bundle 15 at an inner end of the winding portion 20 in the radial direction of the stator 10. In the winding portion 20, the wire bundle 15 is wound into a layered structure in which the wire bundle 15 is stacked on itself in the radial direction of the stator 10 such that each wire 15a of the wire bundle 15 extends along a body portion 30 of the insulator 13, which will be described below. The first winding end 21 of each coil 14 is connected to the second winding end 22 of another coil 14 of the same phase with the crossover portion 15T.

In the present embodiment, the twenty-four core pieces 12 (insulators 13) that are arranged in an annular configuration are attached to the twenty-four teeth 11b of the stator core 11 from the outer side in the radial direction such that the teeth 11b are inserted into the respective core pieces 12. Accordingly, each crossover portion 15T becomes excessively long by an amount corresponding to a reduction in the length of the crossover portion 15T in the circumferential direction. As illustrated in FIG. 2, the excess length of each crossover portion 15T is absorbed and a tension is applied to the crossover portion 15T by bending the crossover portion 15T into a substantially S-shaped form.

Referring to FIGS. 4 to 8, the insulator 13 includes the body portion 30 around which the wire bundle 15 is wound; an outer peripheral flange 31 and an inner peripheral flange 32 provided at the ends of the body portion 30 in the radial direction; an outer separation wall 33 that extends outward in the radial direction from an end of the outer peripheral flange 31 in the axial direction; a first crossover-portion retaining member 41 that projects outward in the axial direction from the outer separation wall 33 and retains a part of the crossover portion 15T that is near the first winding end 21; and a second crossover-portion retaining member 42 that projects outward in the axial direction from an end of the inner peripheral flange 32 in the axial direction and retains a part of the crossover portion 15T that is near the second winding end 22.

The body portion 30 is a tubular portion that is rectangular in cross section, and has a rectangular hole 30a extending therethrough in the radial direction of the stator 10. The body portion 30 includes walls 34 and 35 that are opposed to other in the axial direction of the stator 10 and walls 36 and 37 that are opposed to other in the circumferential direction of the stator 10. The size of the rectangular hole 30a is slightly larger than each tooth 11b of the stator core 11, so that the tooth 11b can be inserted thereinto. A plurality of grooves 38 are formed in the walls 36 and 37 so as to extend in the axial direction of the stator 10. The grooves 38 are provided to position the two wires 15a and 15a of the wire bundle 15 when the wire bundle 15 is wound. The walls 36 and 37 face side surfaces 11f of the teeth 11b in the circumferential direction.

Figure 5:
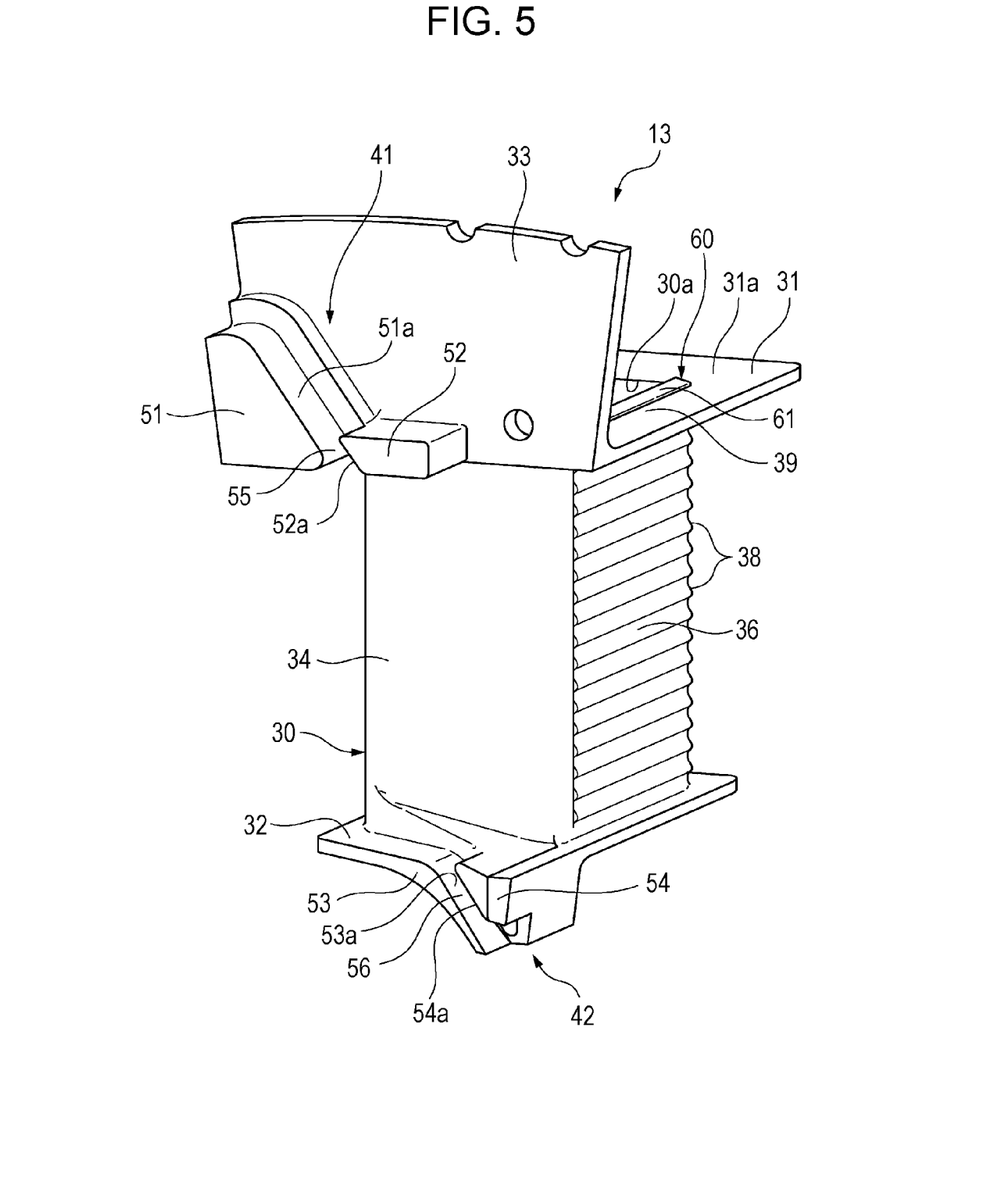
FIG. 5 is a perspective view of an insulator.
Figure 6:
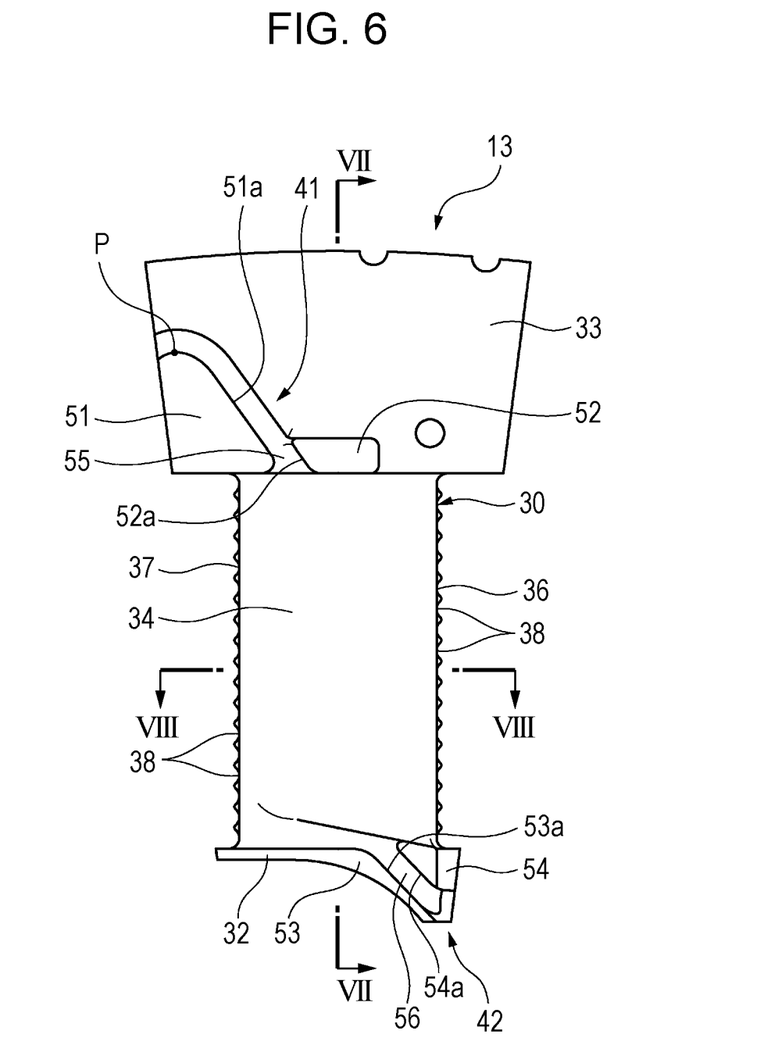
FIG. 6 is a front view of the insulator.
Figure 7:
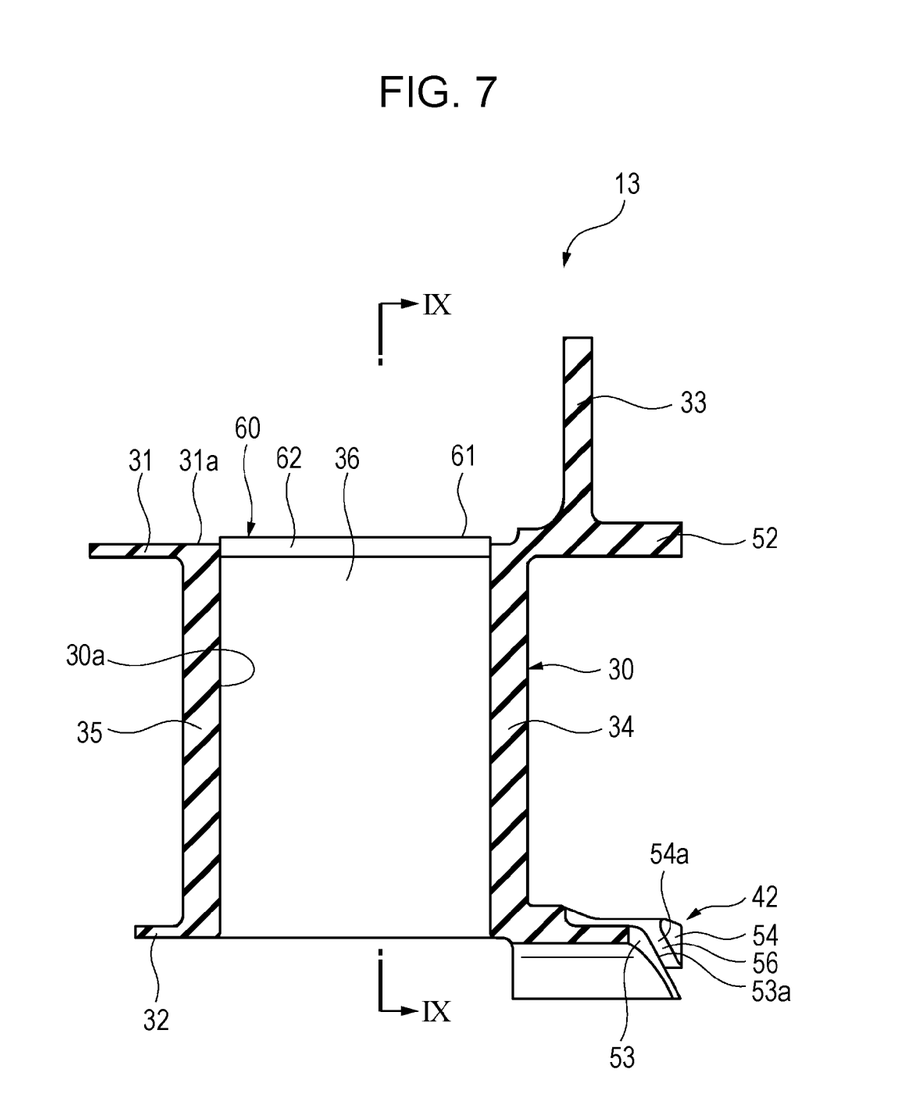
FIG. 7 is a sectional view of FIG. 6 taken along line VII-VII.
Figure 8:
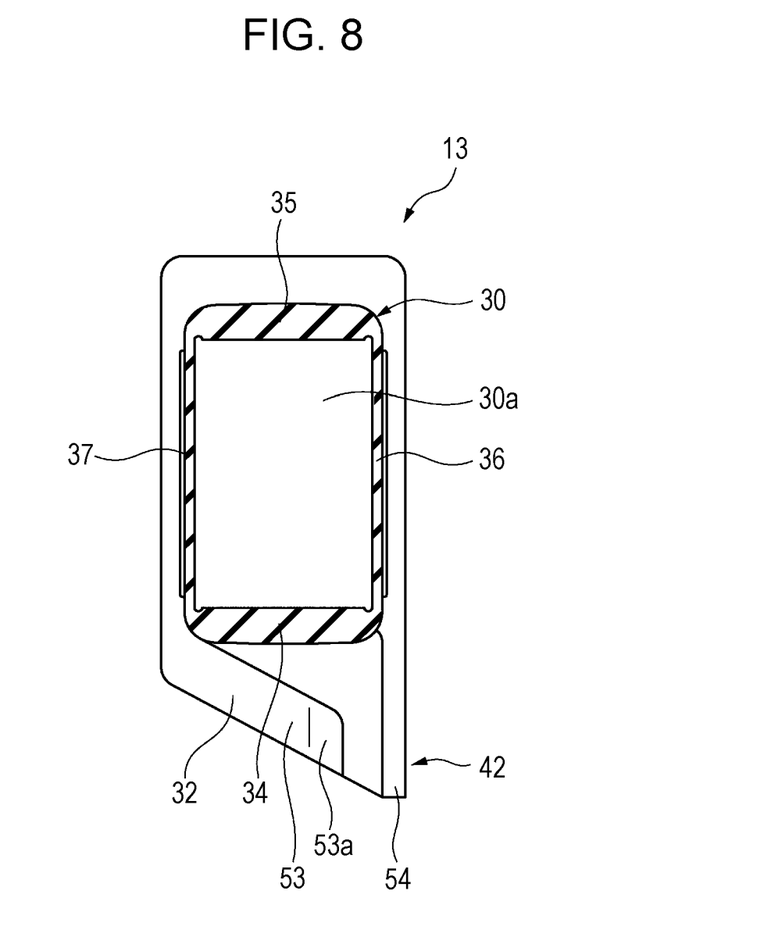
FIG. 8 is a sectional view of FIG. 6 taken along line VIII-VIII.

The first crossover-portion retaining member 41 includes a first binding portion 51, a second binding portion 52, and a retaining groove 55. The first binding portion 51 includes an inclined surface 51a that guides the wire bundle 15 outward in the radial direction of the stator 10 in the same direction as the winding direction of the coil 14. The inclined surface 51a has an upwardly projecting shape with a vertex P at the outer end thereof in the radial direction of the stator 10. The first binding portion 51 retains the crossover portion 15T at the outer end thereof in the radial direction of the stator 10. The second binding portion 52 is disposed so as to face the first binding portion 51 in the circumferential direction of the stator 10, and includes an inclined surface 52a that is parallel to the inclined surface 51a of the first binding portion 51. The second binding portion 52 retains a part of the crossover portion 15T that is retained by the first crossover-portion retaining member 41 at the inner end thereof in the radial direction of the stator 10. The retaining groove 55 that receives the wire bundle 15 is formed between the inclined surfaces 51a and 52a.

The second crossover-portion retaining member 42 includes a third binding portion 53, a fourth binding portion 54, and a retaining groove 56. The third binding portion 53 includes an inclined surface 53a that guides the wire bundle 15 outward in the radial direction of the stator 10 in the same direction as the winding direction of the coil 14. The third binding portion 53 retains the crossover portion 15T. The fourth binding portion 54 is disposed so as to face the third binding portion 53 in the circumferential direction of the stator 10, and includes an inclined surface 54a that is parallel to the inclined surface 53a of the third binding portion 53. The fourth binding portion 54 retains a part of the crossover portion 15T that is retained by the second crossover-portion retaining member 42 at the inner end thereof in the radial direction of the stator 10. The retaining groove 56 that receives the wire bundle 15 is formed between the inclined surfaces 53a and 54a.

Figure 9:
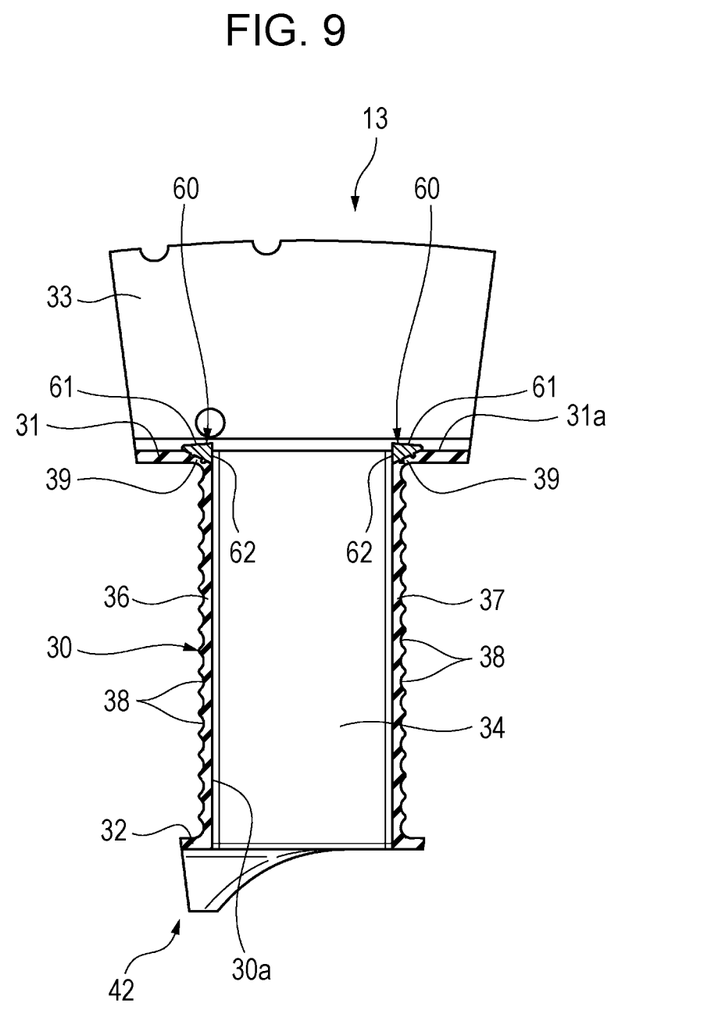
FIG. 9 is a sectional view of FIG. 7 taken along line IX-IX.
Figure 10:
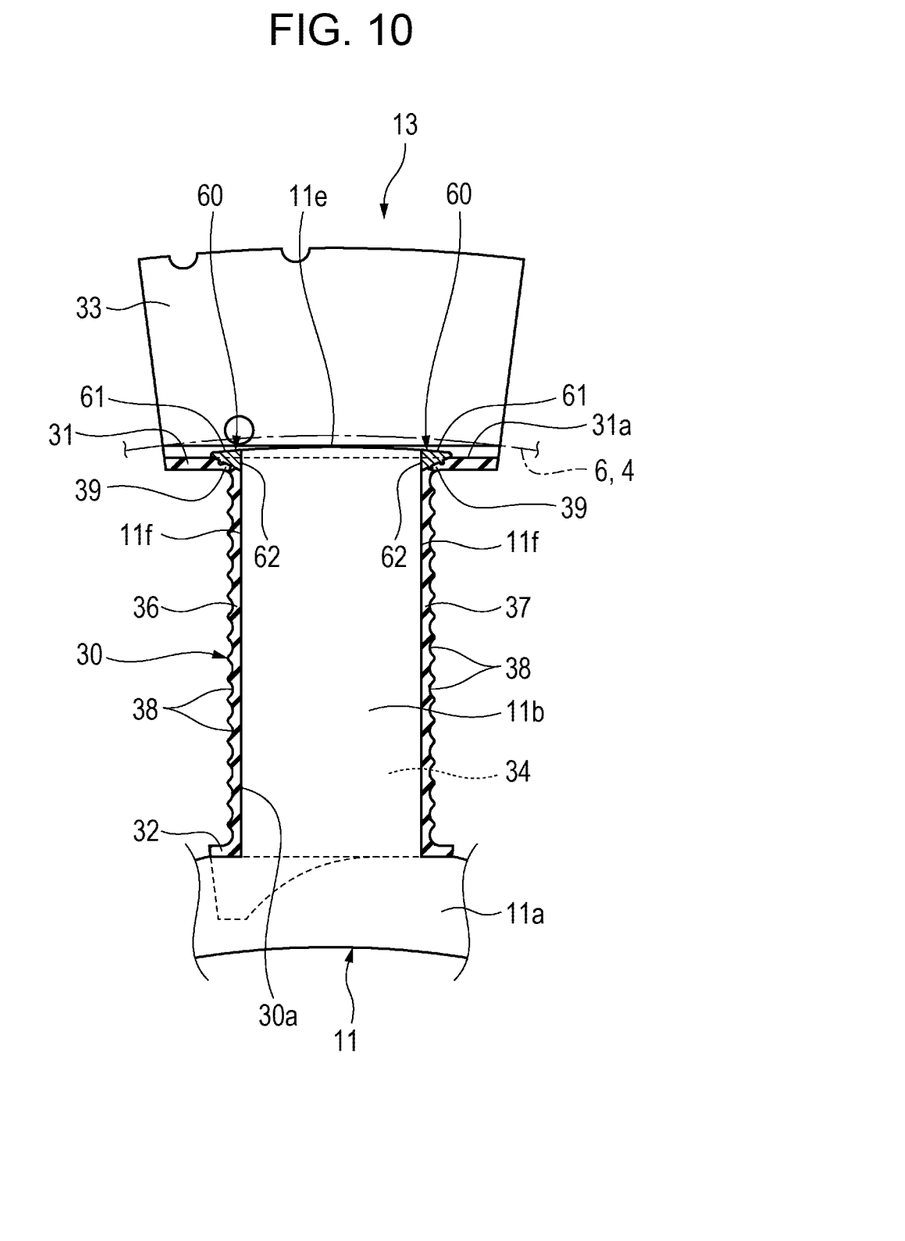
FIG. 10 is a sectional view illustrating the state in which a tooth of the stator core is inserted into the insulator.
Figure 11:
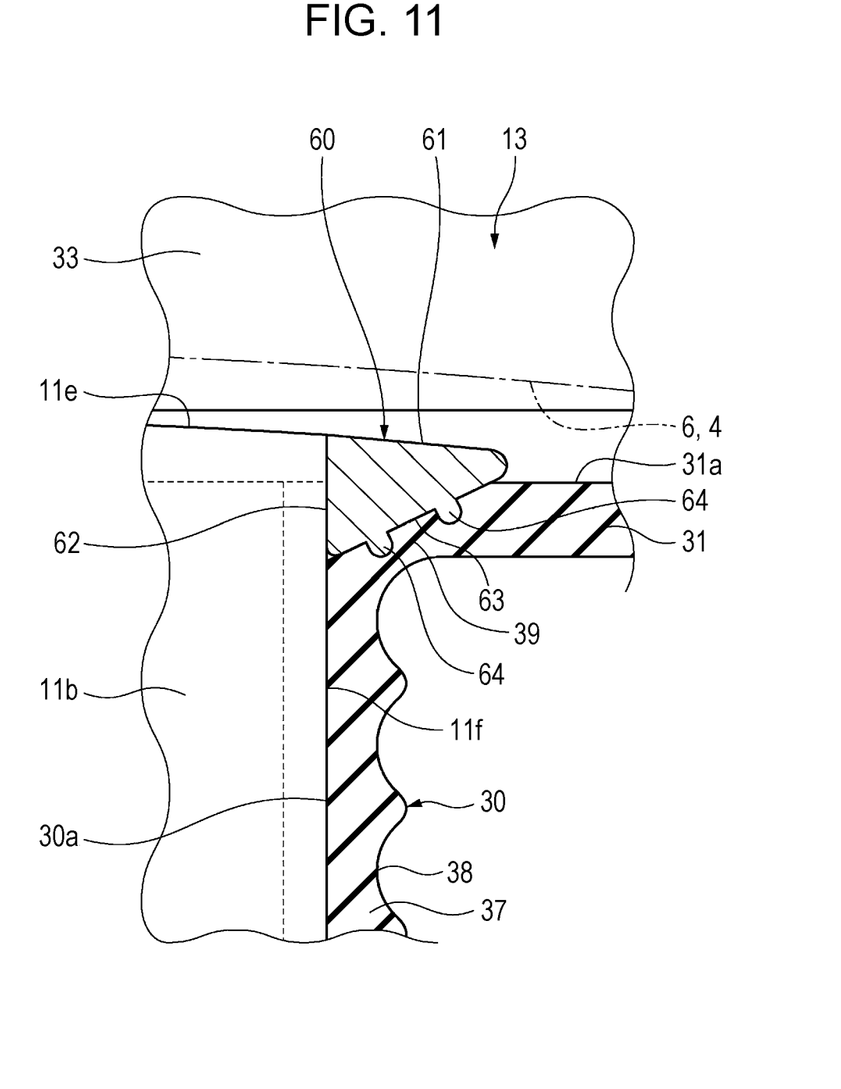
FIG. 11 is an enlarged sectional view of an area around one of auxiliary tooth portions illustrated in FIG. 10.

Referring to FIGS. 9 to 11, auxiliary tooth portions 60 are provided at two axial ridge portions 39, which are bonding portions between the inner surfaces of the walls 36 and 37 of the body portion 30 and an outer peripheral surface 31a of the outer peripheral flange 31. The auxiliary tooth portions 60 are formed by insert molding so as to be partially embedded in the insulator 13, and are fixed to the axial ridge portions 39.

Similar to the stator core 11, the auxiliary tooth portions 60 are formed by stacking a plurality of magnetic steel plates in the axial direction of the stator 10. Referring to FIGS. 10 and 11, each auxiliary tooth portion 60 has a substantially triangular columnar shape, and includes a rotor-facing surface 61 that faces the rotor yoke 6 of the rotor 4 with a small gap therebetween, a tooth-contacting surface 62 that contacts one of the side surfaces 11f of the tooth 11b in the circumferential direction, and an inclined surface 63 that connects an outer end of the rotor-facing surface 61 in the circumferential direction of the stator 10 and an inner end of the tooth-contacting surface 62 in the radial direction of the stator 10. Two projections (fitting portions) 64 that are fitted to the insulator 13 are formed on the inclined surface 63. Instead of stacking the magnetic steel plates, the auxiliary tooth portions 60 may be formed from powder of a magnetic material, such as iron, by pressure molding.

The rotor-facing surface 61 and the tooth-contacting surface 62 of each auxiliary tooth portion 60 are not covered by the resin of the insulator 13, and are exposed.

The rotor-facing surface 61 is formed in an arc shape that extends substantially continuously from the outer end surface 11e of the tooth 11b in the radial direction, and projects outward in the radial direction of the stator 10 from the body portion 30 of the insulator 13. The amount by which the rotor-facing surface 61 projects from the body portion 30 is set such that the gap between the rotor-facing surface 61 and the rotor yoke 6 can be minimized within a range in which the auxiliary tooth portion 60 does not interfere with the rotor yoke 6.

As illustrated in FIG. 11, the tooth-contacting surface 62 preferably contacts one of the side surfaces 11f of the tooth 11b in the circumferential direction with substantially no gap therebetween when the tooth 11b is inserted into the rectangular hole 30a. In such a case, the magnetic flux flow can be smoothed.

Referring to FIGS. 10 and 11, in the outer rotor motor 1 having the above-described structure, when each insulator 13 is attached to the corresponding tooth 11b of the stator core 11 such that the tooth 11b is inserted into the insulator 13, the arc-shaped rotor-facing surfaces 61 of the auxiliary tooth portions 60 are arranged on the extension line of the arc-shaped outer end surface 11e of the tooth 11b in the radial direction, and the tooth-contacting surfaces 62 of the auxiliary tooth portions 60 come into contact with the side surfaces 11f of the tooth 11b in the circumferential direction. Thus, the auxiliary tooth portions 60, which serve as projections that project in the circumferential direction for making the magnetic flux variation gentle in a rotating operation, are arranged on an outer end of each tooth 11b in the circumferential direction at both ends thereof in the circumferential direction.

As described above, in the outer rotor motor 1 according to the present embodiment, each insulator 13 is provided with auxiliary tooth portions 60 at the two axial ridge portions 39 that face the side surfaces 11f of the corresponding tooth 11b in the circumferential direction. The auxiliary tooth portions 60 include the rotor-facing surfaces 61 that face the rotor 4 and the tooth-contacting surfaces 62 that contacts the side surfaces 11f of the tooth 11b in the circumferential direction. Therefore, the magnetic flux variation can be made gentle in the rotating operation, so that the generation of cogging torque and the occurrence of torque ripple can be reduced and the rotor 4 can smoothly rotate. In addition, since the insulators 13 having the coils 14 can be attached to the teeth 11b of the stator core 11 such that the teeth 11b are inserted into the insulators 13, the space factor of the coils 14 can be increased. The motor characteristics can be easily changed simply by changing the shape of the auxiliary tooth portions 60 without changing the other components of the motor 1.

In addition, in the outer rotor motor 1 according to the present embodiment, each auxiliary tooth portion 60 has a substantially triangular columnar shape including the inclined surface 63 that connects the rotor-facing surface 61 and the tooth-contacting surface 62 to each other. Thus, the size of a useless portion of each auxiliary tooth portion 60 that does not largely contribute to the reduction of the cogging torque and the torque ripple can be reduced. Accordingly, the amount of the material of the auxiliary tooth portions 60 can be reduced without degrading the performance. As a result, the manufacturing cost can be reduced.

In addition, in the outer rotor motor 1 according to the present embodiment, each rotor-facing surface 61 is formed in an arc shape that extends substantially continuously from the outer end surface 11e of the tooth 11b in the radial direction. Therefore, a constant gap can be provided between the rotor 4 and the stator 10. Accordingly, the driving/regeneration efficiency can be increased. In addition, the magnetic flux flow can be smoothed, so that the rotation can be stabilized.

In addition, in the outer rotor motor 1 according to the present embodiment, each rotor-facing surface 61 projects outward in the radial direction of the stator 10 from the body portion 30 of the insulator 13. Thus, each auxiliary tooth portion 60 can be positioned near the rotor 4. Accordingly, the driving/regeneration efficiency can be increased and the generation of cogging torque and the occurrence of torque ripple can be further reduced.

In addition, in the outer rotor motor 1 according to the present embodiment, the two projections 64 that are fitted to the insulator 13 are formed on the inclined surface 63 of each auxiliary tooth portion 60. Thus, the bonding force between the auxiliary tooth portion 60 and the insulator 13 can be increased. Accordingly, even when a force, such as a magnetic attraction fore, is applied to the auxiliary tooth portion 60 from the rotor 4 in a radially outward direction, the auxiliary tooth portion 60 can be prevented from being detached from the insulator 13.

In addition, in the outer rotor motor 1 according to the present embodiment, each rotor-facing surface 61 and each tooth-contacting surface 62 are not covered by the resin of the insulator 13, and are exposed. Therefore, the gap between the rotor-facing surface 61 and the rotor 4 and the gap between the tooth-contacting surface 62 and the tooth 11b can be minimized. Accordingly, the driving/regeneration efficiency can be increased and the generation of cogging torque and the occurrence of torque ripple can be further reduced.

The present invention is not limited to the above-described embodiment, and various modifications are possible within the scope of the present invention.

For example, although the present invention is applied to a stator of an outer rotor motor in the above-described embodiment, the present invention may also be applied to a stator of an inner rotor motor.

In addition, in the above-described embodiment, each coil and each crossover portion are formed of a wire bundle including two wires. However, the present invention is not limited to this, and each coil and each crossover portion may be formed of a single wire or a wire bundle including three or more wires.

Obviously, numerous modifications and variations of the present invention are possible in light of the above teachings. It is therefore to be understood that within the scope of the appended claims, the invention may be practiced otherwise than as specifically described herein.

What is claimed is:

1. An outer rotor motor comprising:
   a stator comprising:
      a stator core having a plurality of teeth that extend outward in a radial direction of the stator core;
      coils each including a winding portion formed by winding a wire; and
      insulators retaining the coils and connected to each other in an annular configuration such that the teeth are inserted into the insulators, each of the insulators comprising:
         a body portion around which the wire is wound; and
         an outer peripheral flange provided at an outer end of the body portion in the radial direction; and
   a rotor comprising:
      a rotor holder; and
      a rotor yoke fixed to an inner peripheral surface of the rotor holder;
   the stator and the rotor being arranged to face each other with a gap between the stator and the rotor in the radial direction; and
   each of the insulators being provided with an auxiliary tooth portion on at least one of two axial ridge portions, the axial ridge portions including bonding portions between the body portion and the outer peripheral flange that face side surfaces of corresponding tooth among the teeth in a circumferential direction, the auxiliary tooth portion comprising:
      a rotor-facing surface facing the rotor; and a tooth-contacting surface contacting one of the side surfaces in the circumferential direction, wherein the auxiliary tooth portion has a substantially triangular columnar shape including an inclined surface connecting the rotor-facing surface and the tooth-contacting surface to each other.

2. The outer rotor motor according to claim 1, wherein the rotor-facing surface has an arc shape extending substantially continuously from an outer end surface of the tooth in the radial direction.

3. The outer rotor motor according to claim 1, wherein the rotor-facing surface projects outward in the radial direction of the stator from the body portion of the insulator.

4. The outer rotor motor according to claim 1, wherein the inclined surface of the auxiliary tooth portion is provided with at least one fitting portion fitted to the insulator.

5. The outer rotor motor according to claim 1, wherein the rotor-facing surface and the tooth-contacting surface are not covered by resin of the insulator, and are exposed.

6. The outer rotor motor according to claim 1, wherein the tooth-contacting surface contacts the one of the side surfaces of the tooth with substantially no gap between the tooth-contacting surface and the one of the side surfaces of the tooth.

* * * * *